UNITED STATES PATENT OFFICE.

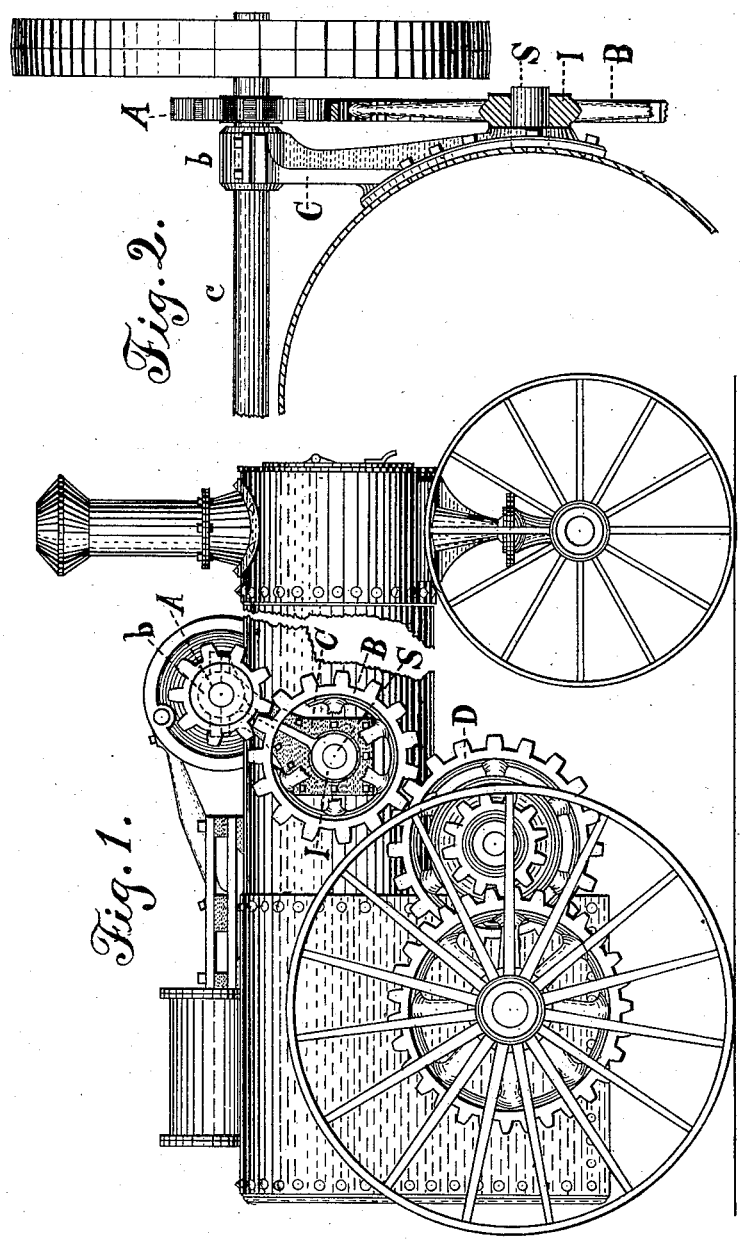

WILLIAM N. RUMELY, OF LA PORTE, INDIANA.

TRACTION-ENGINE.

SPECIFICATION forming part of Letters Patent No. 280,519, dated July 3, 1883.

Application filed November 13, 1882. (No model.)

*To all whom it may concern:*

Be it known that I, WILLIAM N. RUMELY, a citizen of the United States, residing at La Porte, in the county of La Porte and State of Indiana, have invented a new and useful Improvement in the Frame-Work of Traction-Engines, of which the following is a specification.

My invention relates to improvements in the construction of the frame-work for the gearing of a traction-engine; and the object of my invention is to construct a cast bracket to be bolted to the boiler-shell, which will constitute a pillow-block for the crank-shaft, and also a bearing for an intermediate gear-wheel, which is used to transmit motion from a pinion upon the crank-shaft to the differential gearing, and which bracket shall take the place of a pillow-block bracket and of other and separate brackets for gear-wheels intermediate between the crank-shaft pinion and the differential gearing, and for the following reasons: Where a number of small separate brackets (three or four, say) which support the bearings for gear-wheels intermediate between the crank-shaft and the counter-shaft are bolted onto the side of the boiler-shell at from three (3) to six (6) inches apart, the base of any one bracket is necessarily small, and when severe strains come upon the gear-wheel of that bracket the force acting tends to twist or wrench off the bracket from the shell, and, since the transmission of power and of stresses through such a set of gearing tends to twist one bracket in one direction and the adjacent one in an opposite direction, the tendency to distort the boiler-shell at points between any two such bearings is great, and in some cases these stresses are sufficient to wrench such a small bracket from the shell; but were but one intermediate gear-wheel required to transmit the motion of the crank-shaft pinion to the differential gear-wheel on the counter-shaft, and a continuous bracket used which could support the bearing for the intermediate gear-wheel and also constitute a pillow-block for the crank-shaft, a base could be given this one bracket which would be large enough to cover so much shell-surface that it would make a support for the pillow-block and for the intermediate gear-wheel, which would give much more rigidity to bearings for intermediate gear-wheels, and since the transmitted stresses of the wheel and the pinion would be transmitted through the bracket instead of through the boiler-shell the latter would be relieved of all strains from forces transmitted through the gearing. Since the engines now in use have from two (2) to four (4) intermediate gear-wheels and a pillow-block bracket, the use of a single continuous bracket would dispense with from two (2) to four (4) brackets. Further, there will be fewer chances of erring in laying out work for erecting an engine than where several separate brackets are required.

Figure 1 is a side view of a traction-engine, showing a side elevation of my cast bracket. C represents the bracket; A, the pinion on the crank-shaft; B, the gear-wheel intermediate between said pinion A and the differential gear D. I is the boss of the bracket; S, the stud for the gear-wheel; and *b* is the crank-shaft pillow-block.

Fig. 2 is an end view of a cross-section of the boiler, showing the bracket attached and with the crank-shaft *c* in its bearing in the pillow-block and stud S for the boss of the intermediate gear, B.

The same letters in both figures represent the same parts.

The drawings show the bracket bolted to the outside of the boiler-shell, and show that the base of the bracket which is in contact with the shell has a broad flange around the boss and covers quite a large surface of the shell, so that as many as eight (8) or more bolts can be used to secure the bracket to the shell. Hence the side strains upon the intermediate gear-wheel stud will be distributed over so much area that there can be no tendency to weaken the boiler-shell, and since such stresses as may be transmitted through the pinion and the intermediate gear-wheel can act through the continuous bracket only, the shell will not only be relieved of all strains from the transmission of force through the gearing, but the gearing will be held more securely in line.

The bracket is made of cast-iron or cast-steel, and the boss I is bored out and a steel stud, S, is pressed or driven into it for the bearing for the intermediate gear-wheel. A stud could of course be cast to the boss, but would not answer as well as the steel one. The upper end of the bracket is so cast as to form a pillow-block, b, for the crank-shaft.

The portion of the bracket between the boss and the pillow-block may be strengthened by means of one or more webs, as w, running from the boss to the pillow-block.

I claim as my invention—

1. The cast bracket C, for a traction-engine, made so as to form in one casting a boss, I, in which to secure a stud, S, for a bearing for an intermediate gear-wheel, B, and a pillow-block, b, for the crank-shaft, all substantially as shown and described, and for the purpose set forth.

2. The combination, in a single casting for a traction-engine, of a boss, I, in which to secure a stud, S, for a bearing for an intermediate gear-wheel, B, with a pillow-block, b, for the crank-shaft, all substantially as shown and described, and for the purpose set forth.

WILLIAM N. RUMELY.

Witnesses:
H. MAYER,
JOSEPH J. RUMELY.